United States Patent [19]

Harder

[11] Patent Number: 4,883,238

[45] Date of Patent: Nov. 28, 1989

[54] FLY FISHING REEL WITH A LINE RETAINER

[75] Inventor: John R. Harder, East Dorset, Vt.

[73] Assignee: The Orvis Company, Inc., Manchester, Vt.

[21] Appl. No.: 289,306

[22] Filed: Dec. 23, 1988

[51] Int. Cl.$^4$ ............................................. A01K 89/01
[52] U.S. Cl. .................................... 242/317; 242/323; 24/127
[58] Field of Search ...................... 242/84.1 K, 84.1 J, 242/84.5 R, 84.51 R; 24/127

[56] References Cited

U.S. PATENT DOCUMENTS

| | | | |
|---|---|---|---|
| 479,218 | 7/1892 | Koppenhofer | 24/127 |
| 484,661 | 10/1892 | King | 24/127 |
| 1,756,356 | 4/1930 | Hill | 24/127 |
| 2,783,001 | 2/1957 | Grice | 242/84.51 R |
| 3,164,334 | 1/1965 | Gris | 242/84.1 K |
| 3,530,611 | 9/1970 | Britt | 242/84.1 L |
| 3,771,741 | 11/1973 | Stein | 242/84.1 K |
| 4,733,830 | 3/1988 | Hollander | 242/84.5 R |
| 4,762,290 | 8/1988 | Emura | 242/84.1 K |

FOREIGN PATENT DOCUMENTS

| | | | |
|---|---|---|---|
| 1245007 | 9/1960 | France | 242/84.1 J |
| 302860 | 12/1928 | United Kingdom | 242/84.1 J |

Primary Examiner—Joseph J. Hail, III
Assistant Examiner—Katherine Matecki
Attorney, Agent, or Firm—Body, Vickers & Daniels

[57] ABSTRACT

A fly fishing reel having an integral line retainer is described. A stud and an elastomeric member are mounted on the reel providing a convenient line retainer which will not injure line.

14 Claims, 2 Drawing Sheets

4,883,238

FLY FISHING REEL WITH A LINE RETAINER

FIELD OF THE INVENTION

The present invention pertains to the art of fly fishing reels and means for improving the convenience of storage of such reels with lines.

BACKGROUND OF THE INVENTION

Fishing is a sport enjoyed by millions. One type of fishing enjoyed by many people is fly fishing. In fly fishing, a lure known as a "fly" is attached to a line controlled by a fishing rod and reel. The fly fisherman casts the line and fly in a manner which delivers the fly to a selected location. Many fly fisherman spend hours perfecting their casting technique so that a fly may be delivered with accuracy to a desired location on the surface of a body of water and impact upon the body of water in a manner closely resembling the impact of a particular insect on that body of water. Over the years, fly fishing equipment has become very sophisticated. Fly rods are made of bamboo, space age composite materials and other similar materials to have specific flex characteristics which vary over the length of the rod in accordance with patterns which aid casting. Fly lines are often comprised of a length of backing line, a taper section, a leader and a tippet. Each section of the line is manufactured with special characteristics to aid in casting of the fly and line in accordance with the fisherman's desires. Fly fishing line is accordingly expensive. Fly reels have also developed into precision instruments. They are normally comprised of a frame which is fixed to the fly rod and supports a spindle and a spool which comprises a hub and two side walls. The spool is releasably retained on the spindle and holds the body of line being used. Spools are often equipped with a counterweight and handle or other means of being rotated so that following a cast, a fly fisherman may retrieve his line and fly in a controlled manner. Additional controls are often included on a fly reel to aid in the control of the line. These reels are often comprised of parts fabricated of light weight materials, such as aluminum alloy, and precisely fitted to provide a smooth, well balanced mechanism.

The spools are often releasable from the frame of the fly reel for a number of reasons. These reasons include the ability to change lines easily by simply changing spools and ease in cleaning the fly reel.

When a fly reel is not in use, fisherman have improvised means of retaining the line on the reel. These include tying the line to the base and other methods. When a spool containing line is removed from the reel or when the reel is not in use, retaining of the line becomes more difficult.

This and other problems are overcome by the present invention wherein a fly fishing reel is provided with a line retainer.

SUMMARY OF THE INVENTION

In accordance with the present invention, there is provided a fly fishing reel having a line retainer disposed thereon.

Further in accordance with the invention, the line retainer comprises a stud having an enlarged head and an elastomeric member positioned against said stud head for gripping the line to be retained.

Further in accordance with the present invention there is provided a fly fishing reel comprising a frame and spool with a handle on the spool and a line retainer located on the spool in a position diametrically opposed to the spool handle.

Further in accordance with the invention the line retainer has a fixed mass which is related to the mass of the handle in approximately inverse proportion to the relationship between the distance from the spool axis of rotation to the line retainer and the distance from the spool axis to the handle.

Yet further in accordance with the invention the handle and line retainer are both located near the periphery of the spool and have approximately the same mass.

Still further in accordance with the invention the line retainer comprises a metallic stud having an enlarged head and a central shank portion extending inwardly from the large head. The central shank portion is fixed to the spool side wall. A resilient member surrounds the central shank and the end of a fishing line is retained between the resilient member and the inner surface of the head of the stud.

Yet further in accordance with the invention the inner surface of the head of the stud has a conical portion and the outwardly facing surface of the resilient member is flat. These two surfaces define a V-shaped groove for admitting and retaining the end of the fishing line.

Still further in accordance with the invention the resilient member outwardly facing surface and the inner surface of the head of the stud diverge from one another at an angle of about between five and ten degrees.

Yet further in accordance with the invention, a conventional O-ring may be used as the resilient member whereby a line receiving groove is defined by the enlarged head portion and outwardly facing curve of the O-ring; and, a line locking void is defined by the inwardly facing curve of the O-ring, the enlarged head portion and the central shank.

Still further in accordance with the invention the resilient member is an elastomeric member having a hardness of about Durometer 35-60 on the Shore A hardness scale.

The primary object of the present invention is to provide a fly fishing reel of improved convenience.

A further object of the present invention is to provide a fly fishing reel having a line retaining means such that line may be easily and securely retained on the spool when the spool is detached from the remainder of the reel.

Yet another object of the present invention is the provision of a line retaining means on a fly fishing reel which does not require the knotting of the end of the line to retain the end of the line in fixed position for storage.

Still another object of the present invention is the provision of a line retaining mechanism on a fly fishing reel which will not injure the line, tippet or leader when in use.

Still another object of the present invention is the provision of a line retainer on a fly fishing reel allowing the quick retaining of the end of a fly line leader or tippet so that the spool may be quickly and conveniently removed without fear of losing or damaging the line.

These and other objects and advantages of the invention will become apparent from the following description of the preferred embodiment of the invention taken together with the accompanying drawings.

BRIEF DESCRIPTION OF THE DRAWINGS

The invention may take physical form in certain parts and arrangements of parts, a preferred embodiment of which will be described in detail and which is illustrated in the accompanying drawings which form a part hereof and wherein.

DETAILED DESCRIPTION OF THE PREFERRED EMBODIMENT

Figure 1:
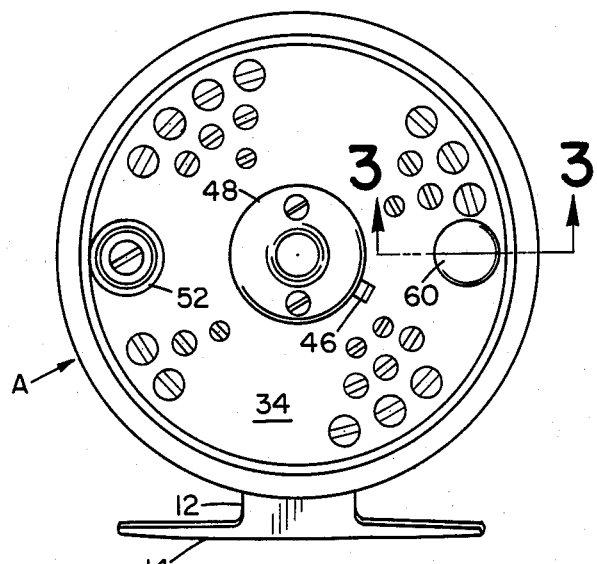
FIG. 1 is a side elevation of a fly fishing reel in accordance with the present invention.
Figure 2:
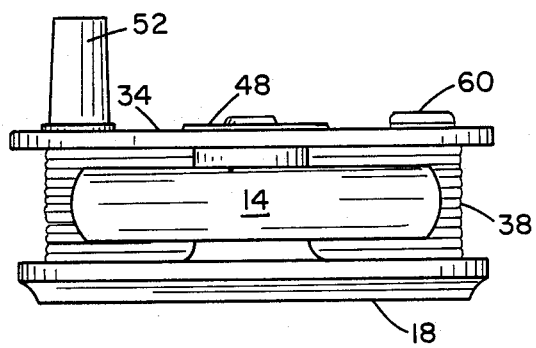
FIG. 2 is a bottom view of the fly fishing reel shown in FIG. 1.
Figure 4:
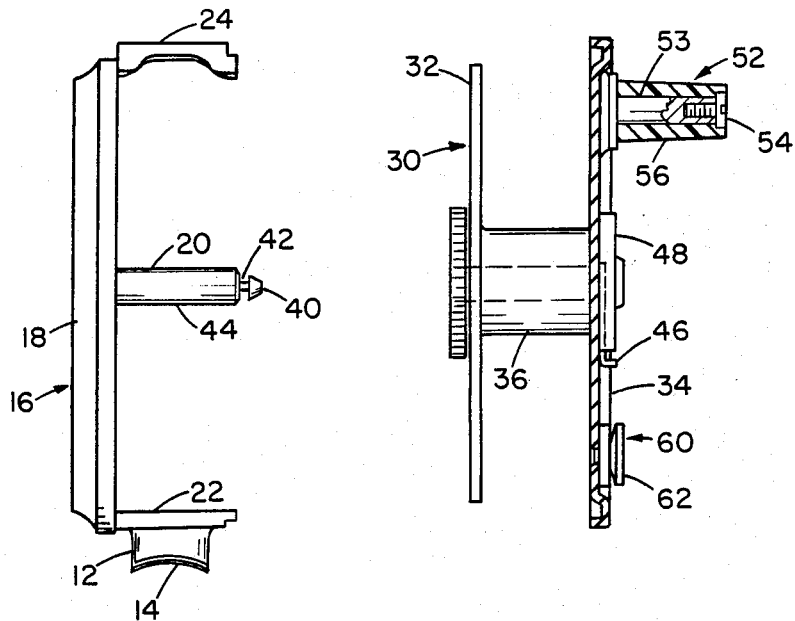
FIG. 4 is a view of the reel seen in FIGS. 1–3 with the spool disassembled from the frame and the spool partially in section.

Referring now to the drawings wherein the showings are for the purpose of illustrating a preferred embodiment of the invention only and not for the purpose of limiting the same, FIG. 1 shows a side view of a fly fishing reel A in accordance with the present invention. A mounting base 12 having an arcuate surface 14 on its underside is used to mount the fishing reel on a fishing rod (not shown) in a conventional manner. As seen in FIGS. 2 and 4, the mounting base 12 is fixed to a frame 16.

Frame 16 is conventional in construction and comprises a generally circular side panel 18 upon which the remaining elements of the reel are mounted. A spindle 20 is fixed to the center of the side panel 18, a mounting base support flange 22 extends perpendicularly to the side panel 18 from its lower edge and a line guide 24 extends perpendicularly to the side panel 18 from its top edge. A spool 30 is rotatably and removably mounted on the frame spindle 20. The spool 30 is comprised of an inner side wall 32, an outer side wall 34 and a hub 36. A length of fishing line 38 is normally wound upon the hub 36 and maintained in lateral position by the two side walls 32 and 34.

The spindle 20 is provided with a truncated conical outer extremity 40, an annular groove 42 and a cylindrical main body portion 44. As can be seen in FIG. 4, the spool 30 is mounted on the frame 16 by sliding it onto the spindle 20. A spring loaded locking lever 46 is mounted on the exterior of the outer side wall 34 and protected in a housing 48. As the spool 30 is slid into the frame 16, the spindle outer extremity 40 pushes the spring loaded locking lever 46 outwardly from the axis of the hub until the spool is fully seated, at which point the locking lever 46 will be disposed over the annular groove 42 and spring inwardly, locking the spool 30 in place. The spool may be easily removed by manually pushing the locking lever 46 to the disengaged position and removing the spool.

A handle 52 is mounted on the outer side wall 34 of the spool 30. The handle 52 is comprised of a post 53 extending from the side wall 34, a machine screw 54 received in the outboard end of the post 53 and a sleeve 56 surrounding the post 53. The machine screw 54 has an enlarged head and retains the sleeve on the post 53 and allows easy rotation of the sleeve 56 about the post 53.

All of the elements thus far described are conventional in fly fishing reels. Additionally, a drag or spool break (not shown) is normally mounted upon the side panel 18 of the frame 16 to interact with a disk or gear on the inner side wall 32 of the spool 30. This drag mechanism is adjustable and controls the ease of rotation of the spool 30 on the frame 16.

Many of the above described elements are fabricated from aluminum alloy and carefully manufactured to produce a light weight reel with a smooth action.

Figure 3:
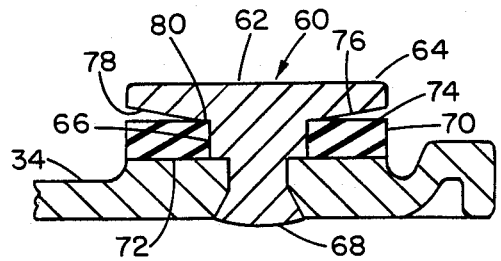
FIG. 3 is a enlarged sectional view taken along line 3—3 of FIG. 1.

In accordance with the present invention, a line retainer 60 is fixed to the outer side wall 34 of the spool 30. As can best be seen in FIG. 1, the line retainer is mounted in a position diametrically opposed to the handle 52. The distance from the axis of the spool 30 to the line retainer 60 is the same as the distance from the axis of the spool to the handle 52. An enlarged cross sectional view of the line retainer is seen in FIG. 3. The line retainer is comprised of a stud 62 having an enlarged head portion 64, a cylindrical intermediate shank portion 66, and a reduced diameter mounting portion 68. The reduced diameter mounting portion 68 is received in a matching aperture in the spool outer side wall 34 and the end of the mounting portion 68 is expanded in a riveting operation permanently mounting the stud 62 to the outer side wall 34.

A resilient annular member 70 is disposed around the intermediate shank portion of the stud 62 between the spool outer side wall 34 and the stud head portion 64. The annular member 70 is fabricated from a elastomeric i.e., rubber-like material which is relatively soft having a hardness of about Durometer 35–60 on the Shore A hardness scale. The annular member resembles a washer in that it has inner flat surface 72 and an outer flat surface 74 which are parallel to one another, an inner cylindrical surface and an outer cylindrical surface. As can be seen in FIG. 3, the inner flat surface 72 of the annular member lays against the surface of the spool outer side wall 34. The outer flat surface 74 faces the inwardly facing surface 76 of the stud head portion 64. The inwardly facing surface 76 of the stud head portion is comprised of a conical or outwardly flared outer portion 78 extending from the outside edge of the head portion 64 inwardly and a flat inner portion 80 extending, as shown, normal to the stud axis from the inner edge of the conical portion to the periphery of the stud intermediate shank portion 66. The flat portion 80 is parallel to the outwardly facing surface of the spool outer side wall 34. As can best be seen in FIG. 3, the resilient annular member 70 is fixed in place between the flat portion 80 on the one side and the spool outer side wall 34 on the other side in an annular region surrounding the intermediate shank portion 66 of the stud 62.

A V-shaped groove is provided around the periphery of the line retainer 60 defined by the outer flat surface 74 of the resilient member 70 and the conical portion 78 of the stud head portion 64. The conical portion 78 diverges from the flat surface 74 at an angle of from five to ten degrees. This angle is sufficient to provide an opening at the outer end of the groove sufficiently large to admit a fishing line 38 or leader and a wedging action between the head portion 64 and the resilient member 70 to retain the line when it is pulled into the line retainer 60.

The riveting means of fixing the stud 62 to the side wall 34 can be replaced by a number of other means. The reduced diameter mounting portion 68 can be threaded with self-tapping threads or with threads matching threads cut into an aperture in the side wall 34. The stud can then be threaded in place and locked with thread lock or the like. This method allows the removal of the stud for the replacement of the resilient member 70 should the fishing reel owner ever so desire. Alternatively, a flat headed or counter sunk nut or other similar device can be mated with a threaded stud to releasably hold the stud in place.

The line retainer stud 62 is fabricated from brass or another dense material and appropriately plated. Its size and composition is selected to balance the weight of the handle 52 and it is mounted diametrically opposite the handle. In the preferred embodiment, the weights of the line retainer 60 and the handle 52 are approximately equal and the retainer is mounted the same distance from the spool axis as the handle 52. If the weights of the two assemblies are not the same, the distance from the axis of rotation of the spool 30 can be adjusted so that dynamic balance is achieved.

The line retainer 60 performs two functions. It is available for the fisherman's use in fixing the end of the fly line 38 on the spool 30 in place and also acts as a counterweight to the handle 52. A well balanced spool is provided and a more convenient fishing reel and line storage spool provided for the fisherman.

Figure 5:
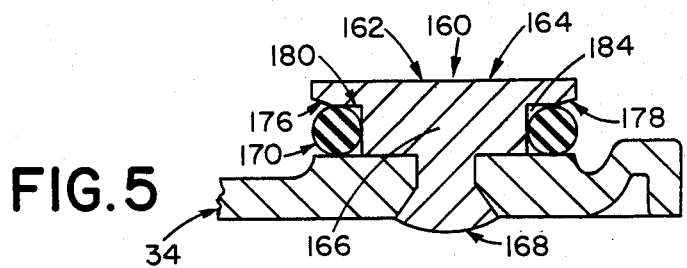
FIG. 5 is an enlarged sectional view taken along line 3—3 of FIG. 1 showing an alternate embodiment of the invention; and, FIG. 6 is an enlarged sectional view taken along line 3—3 of FIG. 1 showing another alternate embodiment of the invention.

An alternate line retainer 160 is shown in FIG. 5. The alternate line retainer 160 is comprised of a stud 162 having an enlarged head portion 164, a cylindrical intermediate shank portion 166 and a reduced diameter mounting portion 168. The reduced diameter mounting portion 168 is identical to the corresponding element seen in FIG. 3 and the stud 168 is mounted on the spool 30 in a manner identical to that described with reference to FIG. 3.

A resilient annular member 170 is disposed around the intermediate shank portion 166 between the spool outer side wall 34 and the stud head portion 164. The annular member is an elastomeric torus having a circular cross-section and is commonly referred to as an O-ring.

The inwardly facing surface 176 of the stud head portion 164 can be slightly conical, flat or, as is shown, comprised of an outer conical portion 178 and an inner flat portion 180. The curvature of the annular member 170 and the inwardly facing surface 176 form a V-shaped groove around the stud 62 into which the line 38 to be retained may be easily introduced. The line is then pulled, forcing it into the enclosed void 184 between the annular member 170, the stud intermediate shank portion 166 and the enlarged head portion 164 in which it is retained until removed. The void 184 provides a positive lock on the line.

Figure 6:
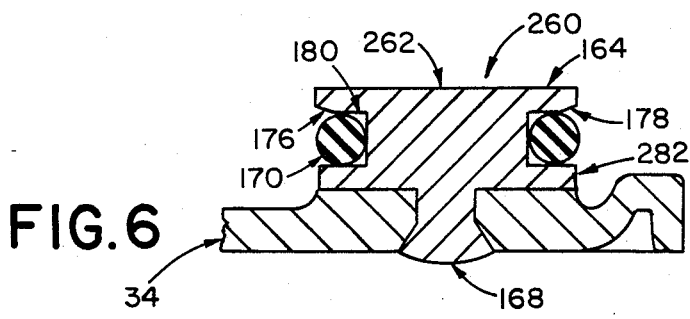

Another alternate embodiment is shown in FIG. 6. The line retainer 260 of this embodiment is identical to the line retainer 160 seen in FIG. 5 except the stud 262 is provided with a washer-like integral base portion 282. The groove accommodating the resilient annular member 170 is thereby elevated above the spool outer side wall 34 and easier to reach. In all other respects, this embodiment operates identically to the embodiment of FIG. 5.

The invention has been described with reference to a preferred embodiment. It will be appreciated that modifications or alterations could be made without deviating from the present invention. Such modifications and alterations will occur to others upon the reading and understanding of this specification. It is intended that all such modifications and alterations be included insofar as they come within the scope of the following claims or the equivalents thereof.

Having thus described the invention, the following is claimed:

1. In a fly fishing reel comprising:
   a frame having a mounting means for attaching said frame to a fly rod and a spindle;
   a spool having an axis, said spool comprising a first side wall having a periphery, a second side wall having a periphery and a hub adapted to rotate about said spindle;
   a handle having a fixed mass located on one of said side walls;
   the improvement comprising;
   a line retainer located on the said one of said side walls at a position diametrically opposed to said handle, said line retainer having a fixed mass related to the mass of said handle in approximately inverse proportionality to the relationship between the distance from the spool axis to the line retainer and the distance from the spool axis to the handle to afford balanced rotational movement of the spool; wherein said line retainer comprises a metallic stud having an enlarged head portion secured to said one side wall and having resilient gripping means which, along with said head portion, defines a groove adapted to grip a fishing line below said head portion.

2. The reel of claim 1 wherein said handle is located near the periphery of said one of said side walls a fixed distance from the spool axis, said line retainer is located near the periphery of said one of said side walls the said fixed distance from the spool axis, and said handle and said line retainer have approximately the same mass to afford said balanced rotational movement of the spool.

3. The reel of claim 1 wherein said wherein said line retainer comprises a metallic stud having an enlarged head portion secured to said one side wall and having resilient gripping means whiuch, along with said head portion, defines a groove adapted to grip a fishing line below said head portion. metallic stud comprises an outer surface and an inner surface, an intermediate shank portion extending from the inner surface of said head portion, said intermediate shank portion having a cross-sectional area smaller than the cross-sectional area of said head portion, means fixing said stud to said one of said side walls; and said gripping means comprises an annular resilient rubber-like member surrounding said intermediate shank portion and fitted tightly between the said one side wall and the said inner surface of said head portion to grip the fishing line on insertion therebetween, wherein said groove is outwardly opening and flaring.

4. The reel of claim 3 wherein said stud has an axis and said head portion inner surface comprises a flat inner portion extending normal to said stud axis and a conical outer portion extending from the periphery of the head portion inwardly to said flat inner portion of said inner surface whereby the periphery of said inner surface is spaced further from said one side wall than said flat inner portion of said inner surface.

5. The reel of claim 4 wherein said resilient member has a flat outwardly facing surface extending normal to said stud axis and facing the inner surface of said stud head portion.

6. The reel of claim 5 wherein the said conical outer portion of said stud head inner surface and said resilient member outwardly facing flat surface form the walls of said annular groove, said flat outwardly facing surface and said conical outer portion of said inner surface diverging from one another at an angle of about between 5 and 10 degrees.

7. The reel of claim 3 wherein said resilient member is an elastomeric member having a hardness of about Durometer 35-60 on the Shore A scale.

8. The reel of claim 3 wherein said line retainer annular resilient member is an O-ring.

9. The reel of claim 8 wherein said enlarged head portion has an underside, said enlarged head portion underside and said O-ring define said outwardly flaring annular groove around the stud, and the enlarged head portion, the O-ring and the intermedaite shank portion define an annular inner void around said stud.

10. The reel of claim 8 wherein said O-ring has a hardness of about Durometer 35-60 on the Shore A scale.

11. In a fly fishing reel comprising:
a frame having a mounting means for attaching said frame to a fly rod and a spindle;
a spool having an axis, said spool comprising a first side wall having a periphery, a second side wall having a periphery and a hub mounted on and adapted to rotate about said spindle;
the improvement comprising:
a line retainer comprising a stud mounted on said reel, said stud comprising a cylindrical intermediate shank portion fixed to one of said side walls and having a shank diameter and a stud axis and an enlarged head portion having an inner surface, said line retainer further comprising an annular resilient rubber-like member surrounding and retained on said shank portion and fitted tightly between said inner surface of said head portion and said one side wall and defining with said inner surface a radially outwardly opening and flaring annular groove therebetween.

12. The reel of claim 11 wherein said stud additionally comprises a cylindrical base portion having a diameter larger than said shank diameter on the side of said shank portion opposite said enlarged head portion whereby said base portion, said shank portion and said enlarged head portion define a circumferential groove retaining said resilient member in said tightly fitted position therebetween.

13. The reel of claim 12 wherein said resilient member is an O-ring having a hardness of about Durometer 35-60 on the Shore A scale.

14. The reel of claim 11 wherein said stud has an axis and said stud head portion inner surface comprises a flat inner portion extending normal to said stud axis and an outwardly flared outer portion extending from the periphery of the head portion inwardly to said flat inner portion of said inner surface, said resilient member having a flat outwardly facing surface extending normal to said stud axis and facing the inner surface of said stud head portion, and said outwardly flared outer portion of said stud head inner surface and the said outwardly facing flat surface of said resilient member form the walls of said annular groove.

* * * * *